US006438229B1

(12) United States Patent
Overy et al.

(10) Patent No.: US 6,438,229 B1
(45) Date of Patent: Aug. 20, 2002

(54) RADIO TELEPHONE HOLDER WITH BATTERY CHARGING AND MOVABLE CRADLE HAVING TELEPHONE LOCK

(75) Inventors: Michael Overy, Hampshire; Sean Prior, Surrey, both of (GB)

(73) Assignee: Nokia Mobile Phones Limited, Espoo (FI)

( * ) Notice: Subject to any disclaimer, the term of this patent is extended or adjusted under 35 U.S.C. 154(b) by 1244 days.

(21) Appl. No.: 08/856,943

(22) Filed: May 15, 1997

Related U.S. Application Data

(63) Continuation of application No. 08/519,921, filed on Aug. 28, 1995, now abandoned.

(30) Foreign Application Priority Data

Sep. 8, 1994 (GB) .............................. 9418095

(51) Int. Cl.[7] .................................. H04M 1/00
(52) U.S. Cl. ...................... 379/446; 379/455
(58) Field of Search .............. 379/446, 455, 379/454, 435, 436, 426, 449, 428; 320/2; 485/90, 128, 575

(56) References Cited

U.S. PATENT DOCUMENTS

| | | | |
|---|---|---|---|
| 4,406,928 A | 9/1983 | MacKenzie | 179/146 R |
| 4,640,542 A | 2/1987 | Watjer et al. | 296/37.8 |
| 4,903,325 A | 2/1990 | Yoshitake et al. | 455/89 |
| 4,957,264 A | 9/1990 | Hakanen | 248/510 |
| D327,070 S | 6/1992 | Watanabe | D14/251 |
| 5,121,863 A | 6/1992 | Kotitalo et al. | 224/42 |
| 5,142,573 A | 8/1992 | Umezawa | 379/454 |
| 5,179,590 A | 1/1993 | Wang | 379/454 |
| 5,189,358 A | 2/1993 | Tomura et al. | 320/2 |
| 5,222,132 A | 6/1993 | Rioux, Jr. | 379/455 |
| 5,248,264 A | 9/1993 | Long et al. | 439/347 |
| 5,256,955 A | 10/1993 | Tomura et al. | 320/2 |
| 5,305,381 A | 4/1994 | Wang et al. | 379/455 |
| 5,457,745 A | 10/1995 | Wang | 379/454 |
| 5,471,530 A | 11/1995 | Chen | 379/446 |

FOREIGN PATENT DOCUMENTS

| | | | |
|---|---|---|---|
| DE | 4015091 | | 1/1991 |
| DE | 4310600 | | 7/1994 |
| EP | 0121292 | | 10/1984 |
| EP | 0280061 | | 8/1988 |
| EP | 0341395 | | 11/1989 |
| EP | 0506439 | | 9/1992 |
| EP | 0545670 | | 6/1993 |
| GB | 2259179 | | 3/1993 |
| GB | 2268844 | | 1/1994 |
| GB | 2275582 | | 8/1994 |
| JP | 3-85949 | | 4/1991 |
| JP | 6-132869 | * | 5/1994 ............... 455/90 |

OTHER PUBLICATIONS

Patent Abstracts of Japan, vol. 13, No. 280, (E–779), Jun. 27, 1989 for JP–A–1067054.

* cited by examiner

*Primary Examiner*—Jack Chiang
(74) *Attorney, Agent, or Firm*—Perman & Green, LLP

(57) ABSTRACT

A radio telephone cradle for holding a handset and providing a battery recharging facility. A catch is provided for securing the handset relative to the cradle member to maintain electrical contact between the telephone's battery and the charger when the telephone is stowed in the cradle.

10 Claims, 7 Drawing Sheets

RADIO TELEPHONE HOLDER WITH BATTERY CHARGING AND MOVABLE CRADLE HAVING TELEPHONE LOCK

This application is a continuation of application(s) Ser. No. 08/519,921 filed on Aug. 28, 1995, now abandoned.

BACKGROUND OF THE INVENTION

The invention relates to a holder that performs the dual functions of storing and recharging a battery of a radio telephone. In particular the holder may store a radio telephone handset or portable telephone and recharge the battery while in situ on the phone.

For convenience, holders for radio telephones are often designed to provide a charging current to recharge a battery while stored.

Some prior art holders of this type have included the additional feature that electrical contact between the current source and battery pack is achieved simply by placing the entire radio telephone in the cradle member. The weight of the radio telephone has generally been sufficient to ensure good contact is made between a sprung connector in the bottom of the cradle member and a fixed contact on the bottom of the radio telephone. The weight of a radio telephone is, however, a design consideration and as radio telephones have become lighter the contact achieved under gravity has become less reliable.

SUMMARY OF THE INVENTION

According to a first aspect of the present invention there is provided a holder for charging a radio telephone battery disposed within a housing comprising a cradle member, means for supplying charging current for charging the battery, an electrical contact disposed to allow electrical contact between the battery and the means for supplying charging current on positioning the housing in the cradle member, and means for releasably locking the housing relative to the cradle member in such a position that electrical contact between the battery and the means for supplying charging current is maintained.

The invention provides the advantage that a reliable electrical contact is maintained between the battery and the means for supplying charging current. This is particularly, although not exclusively, useful when the radio telephone is relatively light.

The holder is preferably adapted to store a handset or portable phone, the battery taking the form of battery pack that is rechargeable in situ. The holder may, however, be adapted to store a battery pack on its own. The term housing refers accordingly to the entire telephone or the battery housing alone.

The invention is useful for hand portable phones stored in cradles on desks or walls and for in-car mobile phone applications. The means for releasably locking, which may be a latch, keeps the phone or handset captive within the cradle member preventing it from being knocked from its position in the cradle member.

The means for releasably locking may comprise a latching member disposed on the cradle for engagement with a complementary latching member located in relation to the battery. The latching members are preferably engaged and disengaged by successive depressions of the housing relative to the cradle member. This has the advantage that no operation other than placing the phone in the holder need be performed to lock it in position, and the further advantage that the same operation frees the phone for withdrawal. This is of particular importance for in-car applications where a minimal degree of visual input for operation is desirable for safety.

The latching member disposed on the cradle may comprise a carriage, movable between a first position and second position under the action of a resilient member. The complementary latching member may be a slot and the carriage may comprise an arm carrying a catch movable between positions in which the latch is engaged with and disengaged from the slot. The arm is preferably resilient and has a camming surface that abuts a lip on the cradle member as the carriage moves between the first and second positions causing the arm to divert from its unbiased position to move the latch between engaged and disengaged positions.

The means for releasably locking may alternatively comprise cooperating elements disposed one on each of the handset or phone and cradle member whereby engagement is effected by abutment of the cooperating elements, preferably under a spring bias. The cooperating elements may be a fixed protrusion disposed on the cradle member and a slot disposed on the phone or handset or vice versa.

This arrangement similarly has the advantage that the means for releasably locking can be engaged as the handset is placed in the cradle member. Again by depressing the handset or phone against the spring bias the phone or battery can be disengaged from the cradle allowing the same movement to be employed for both engagement and disengagement of the means for releasably locking.

According to a second aspect of the invention there is provided apparatus comprising a radio telephone battery disposed within a housing, a cradle member for receiving the housing, means for supplying charging current for charging the battery, an electrical contact disposed to allow electrical contact between the battery and the means for supplying charging current on positioning the housing within the cradle member, and means for releasably locking the housing relative to the cradle member in such a position that electrical contact is maintained between the battery and the means for supplying charging current.

BRIEF DESCRIPTION OF THE DRAWINGS

Embodiments of the invention will now be described, by way of example only, with reference to the accompanying drawings of which.

DETAILED DESCRIPTION OF THE INVENTION

Figure 1:
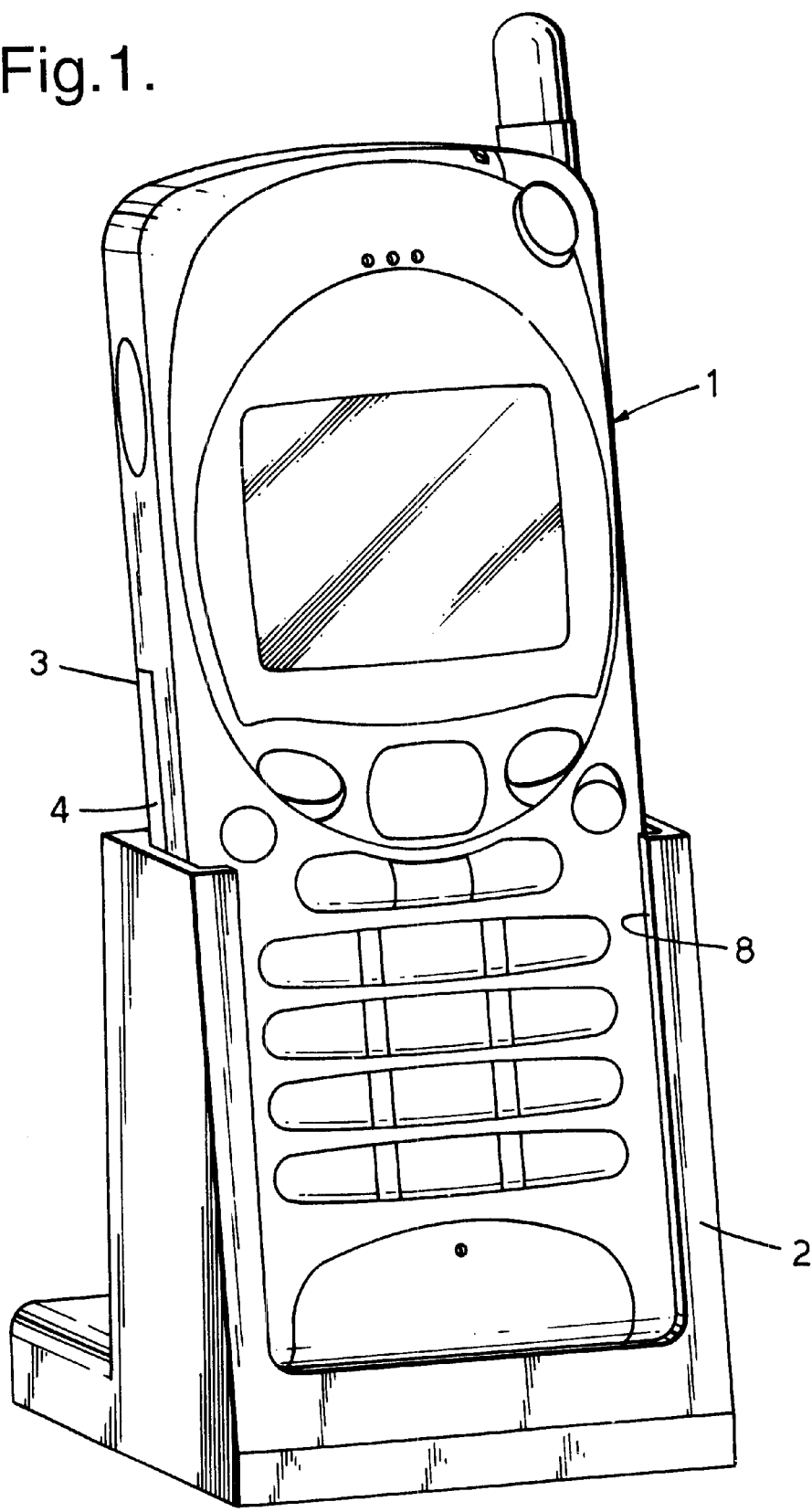
FIG. 1 is a perspective view of a handset supported in a cradle member that performs the dual function of storing a handset and recharging a battery pack.

A first embodiment of the invention is described with reference to FIGS. 1–4 of the drawings. The radio telephone apparatus shown in FIG. 1 includes a generally elongate handset 1 located within a cradle member 2. The handset includes a hand portable telephone 3 and a battery pack 4. The cradle member 2 includes a storage compartment 8 for receiving the handset 1. A sprung contact 9 seen in FIG. 2 is located at the bottom of the storage compartment 8 and a fixed contact 10 is provided on the bottom of the handset 1 to facilitate electrical contact between the battery pack and a source of charging current fed to sprung contact 9.

Figure 2:
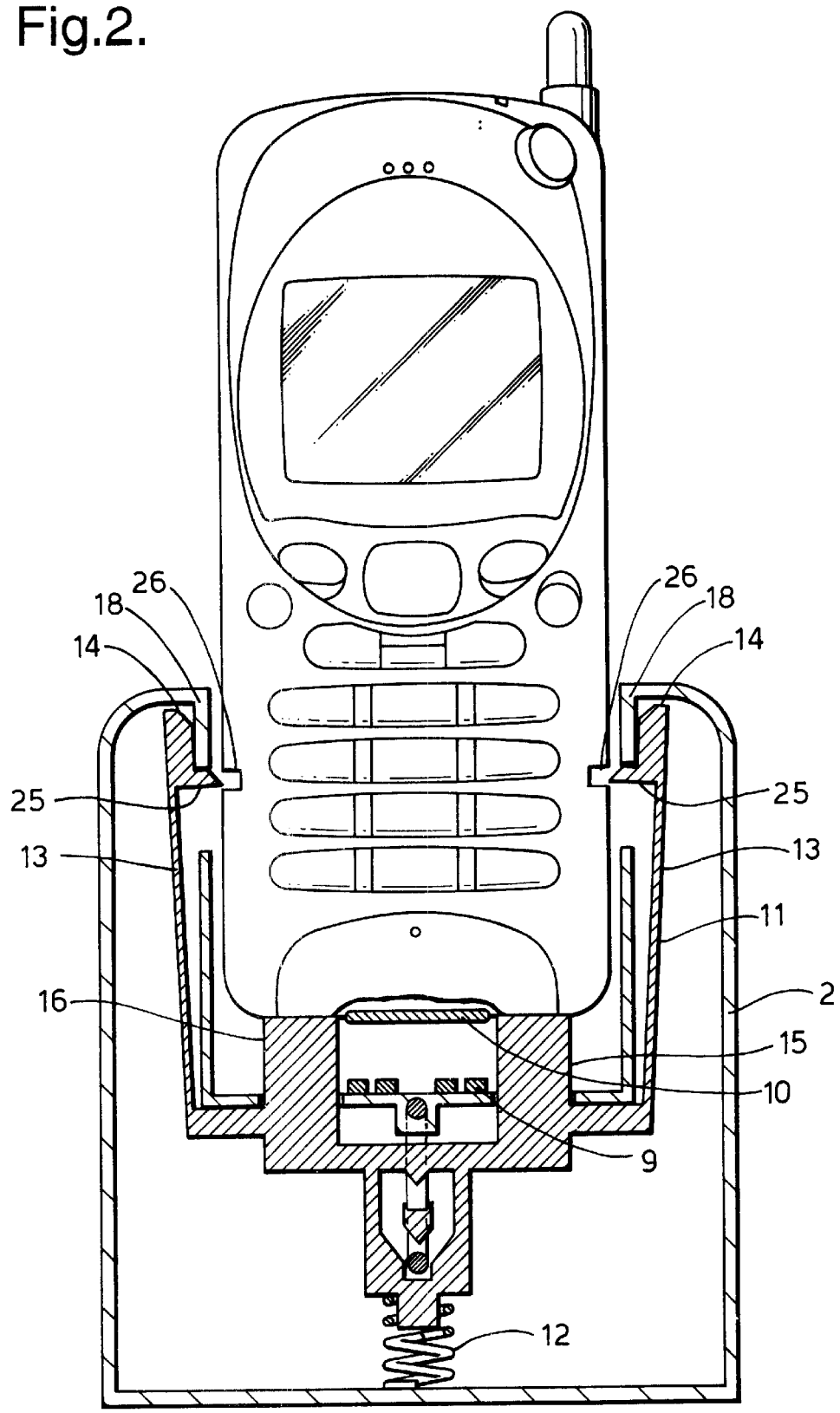
FIG. 2 is a schematic representation of a first embodiment of the invention prior to the phone being captured by the holder.

In FIG. 2 the latching mechanism can be seen in section. The handset 1 in this illustration is in the position it adopts before the latching mechanism is engaged and after the latch is released. The latching mechanism includes a carriage 11, that is biased by the action of the spring 12 to take the position illustrated in FIG. 2. The carriage 11 has resilient arms 13 that tend to remain parallel but are forced apart by contact between camming surface 14 and lip 18 of the compartment 8 as the carriage 11 rises to its uppermost position (FIG. 2). In this position, the bottom of the phone rests on two supports 15, 16. Sprung contacts 9, fixed with respect to the cradle 2, are out of contact with the fixed contacts 10 on the bottom of the handset 1.

Figure 3A:
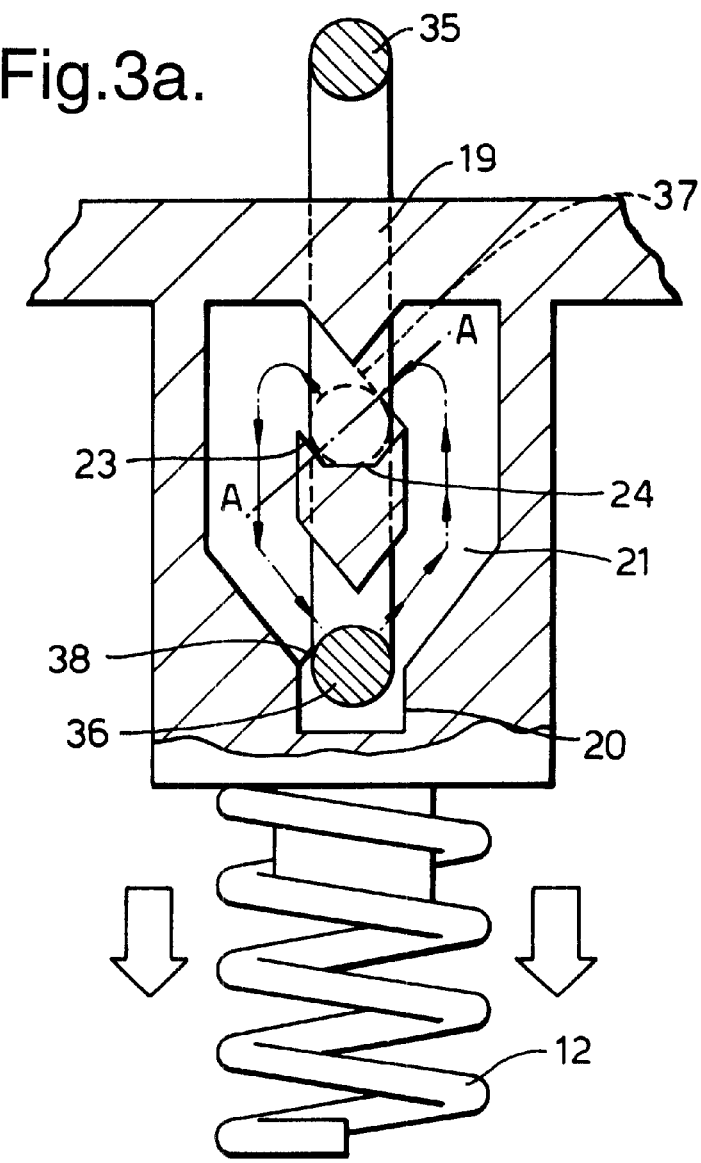
FIGS. 3a and 3b are schematic representations of the latching mechanism for the first and second embodiments.
Figure 3B:
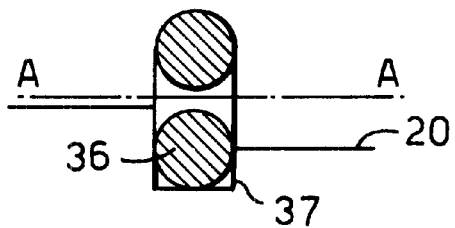

The latching mechanism can be seen schematically in FIGS. 3a and 3b. The latch itself is of the 'push-on push-off' type, ie depressing it the first time causes the latch to engage whereas pushing it the next time causes it to release. The spring 12 allows the carriage 11 to move up and down relative to the cradle 2.

A rod 19 is free to rotate about its point of attachment 35 to the cradle 2. The rod 19 has a pin 36 at one end that is located in a channel 20. As the spring is compressed by pushing the phone down, the pin 36 moves in the channel 20 in the direction of the arrows 21 (seen in broken lines in FIG. 3a) from an entry/removal position to a locked position. The floor of the channel 20 has a slight gradient so that as the pin 36 moves from the entry to the locked position it moves slightly outward. As the pin 36 approaches the locked position, the channel floor drops away and as the phone is released the pin 36 drops into the locked position where a wall 37 (see FIG. 3b) prevents the pin 36 from returning to the entry/removal position in the reverse direction. When the spring is depressed once again the pin 36, prevented by the wall 37 from retracing its path, follows the channel 20 in the direction of the arrows this time to the entry/removal position. The floor of this second part of the channel 20 also has a slight gradient so that the pin 36 moves outwards as it approaches the entry/removal position. At this point the floor of the channel 20 again drops away and the pin 36 drops into the entry/removal position where a wall 38 between the two sections of the channel prevents the pin 36 from moving against the direction of the arrows 21 when the spring is compressed once again by pressing the phone down in the cradle.

Figure 4:
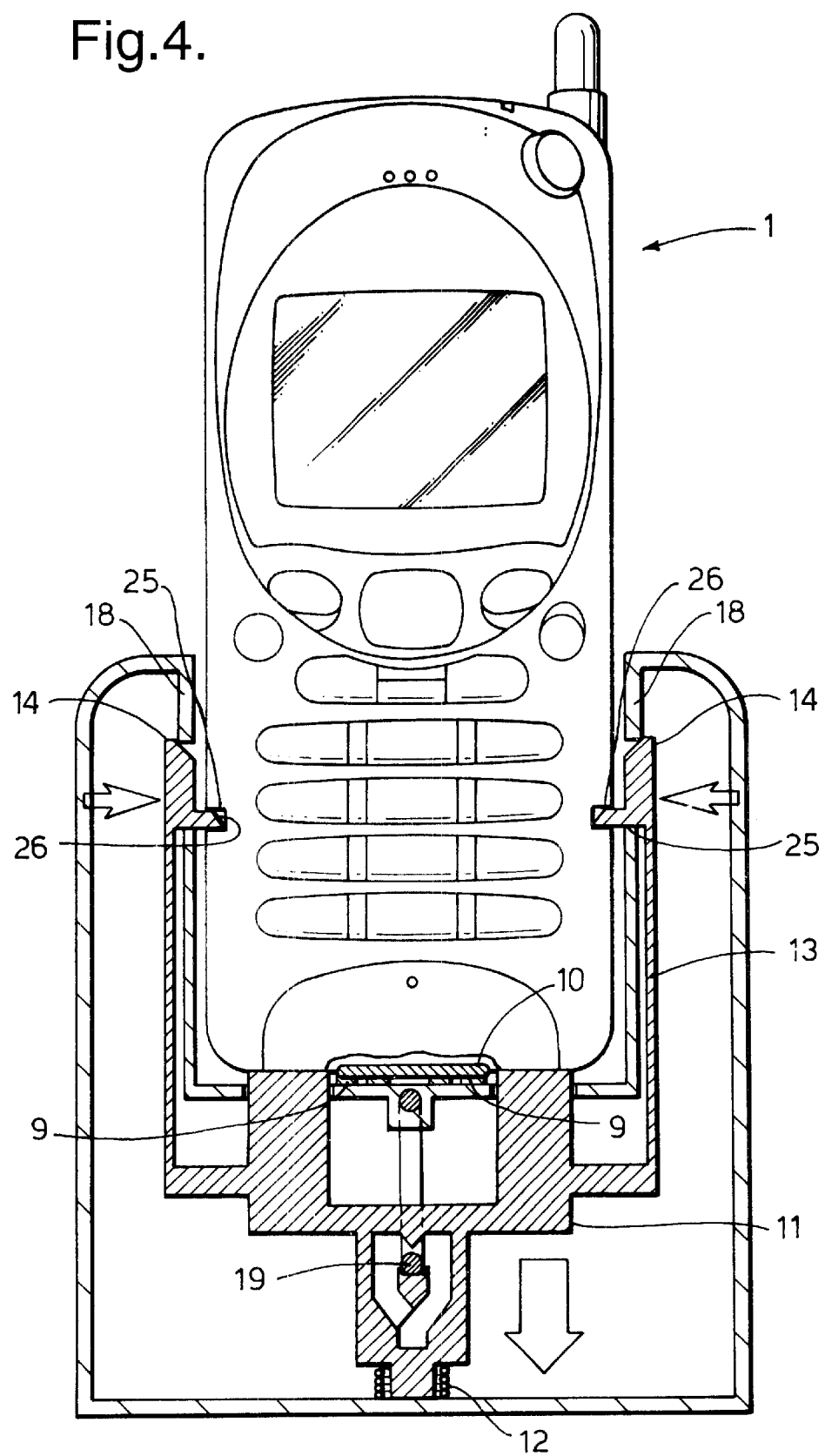
FIG. 4 is a schematic representation of the embodiment of FIG. 2 with the phone captured by the holder.

When the rod 19 is captured in the locked position, the spring 12 is held in a compressed state (FIG. 4). The arms 13, no longer forced apart by the lip 18, are allowed to take their natural position. They return to a vertical position under their own resilience and catches 25 engage in complementary slots 26 located on the phone. In this position the carriage 11 is unable to move relative to the compartment and the handset 1 is accordingly captured within the cradle 2. The contacts 10 on the bottom of the handset 1 are held in electrical contact with the complementary sprung contacts 9 of the cradle 2.

To release the handset 1 from the cradle 2, the handset 1 must be depressed. Once the rod 19 is no longer retained in the locked position the spring is free to expand causing the carriage 11 to rise until the rod 19 has moved to the entry/removal position. As the spring 12 expands, the carriage 11 rises and the arms 13 are forced apart as the camming surface 14 makes contact with the lip 18. In this way the catches 25 are disengaged from the complementary slots 26 and the handset 1 is free for removal from the cradle 2.

Figure 5:
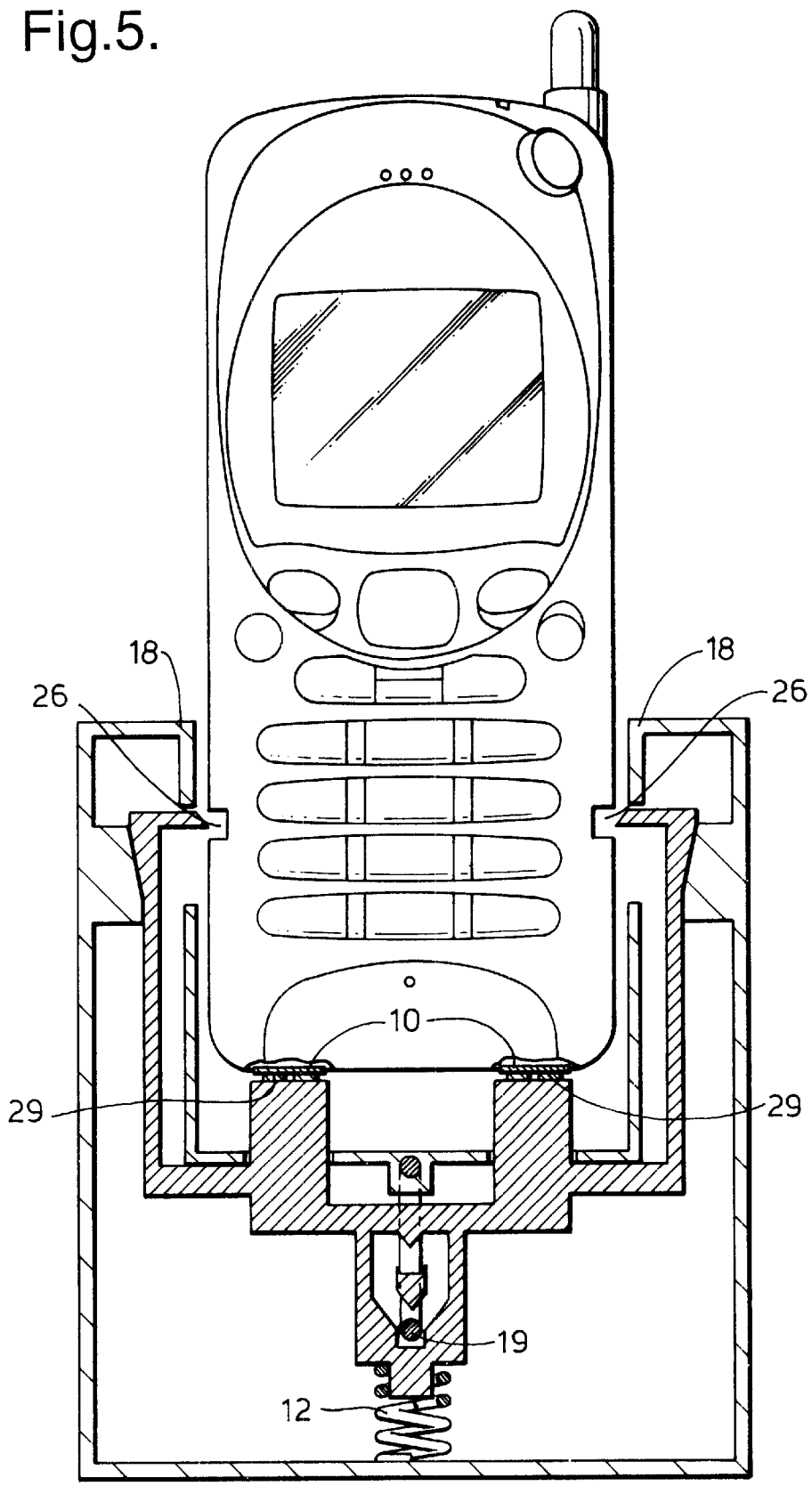
FIG. 5 is a schematic representation of a second embodiment of the invention prior to the phone being captured by the holder.
Figure 6:
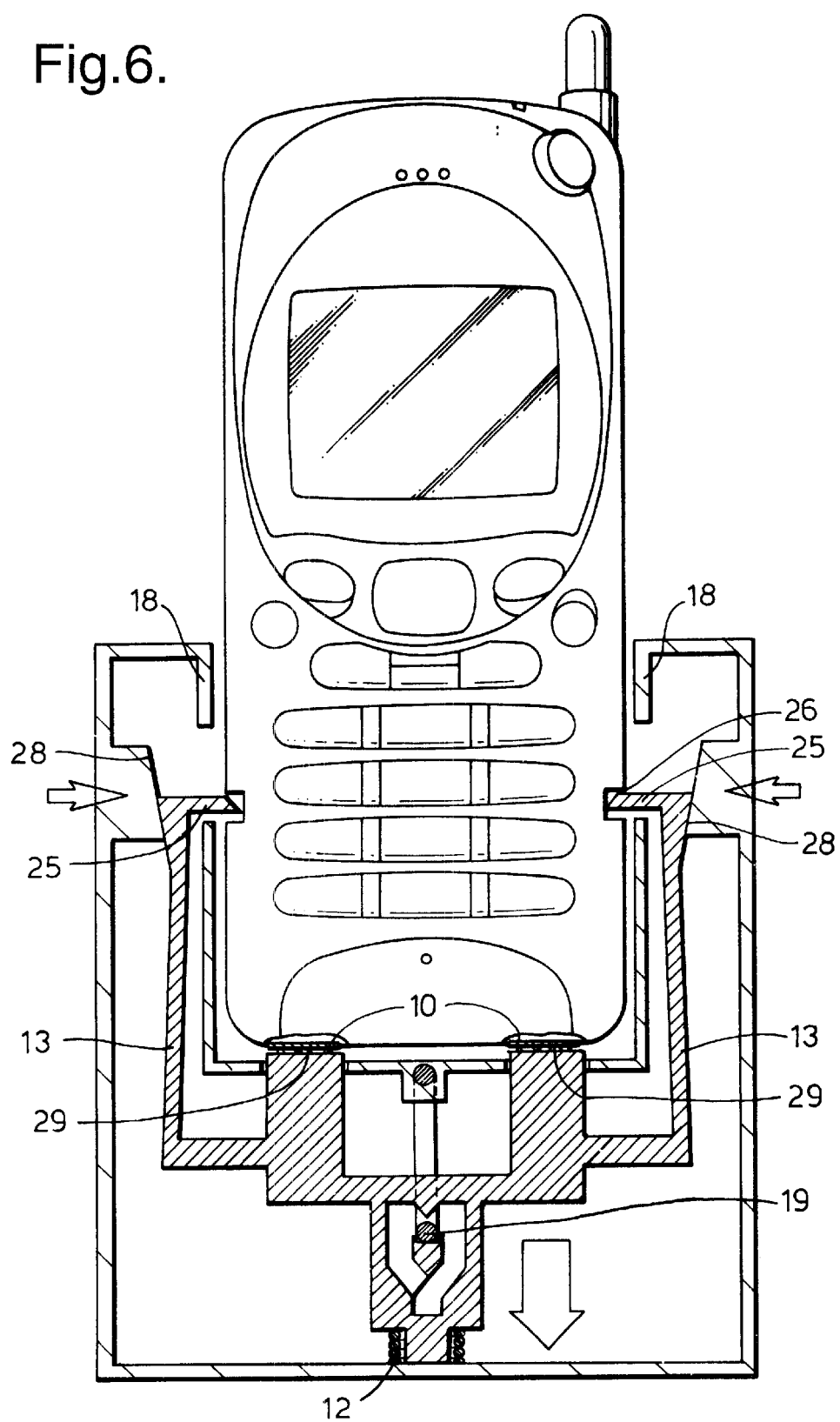
FIG. 6 is a schematic representation of the embodiment of FIG. 5 with the phone captured by the holder.

A second embodiment of the invention illustrated in FIGS. 5 and 6 is similar in operation to the first embodiment and like parts have been designated with the same reference numerals. There are two main differences between the first and second embodiments. Firstly, in the second embodiment sprung contacts 9 are carried by the carriage 11 rather than being fixed relative to the cradle 2, and secondly, the arms 13 are urged inwards by a camming surface 28 to engage the catches 25 with the complementary slots 26 rather than being urged outwards to disengage as in the previous embodiment.

In the embodiment of FIGS. 5 and 6 when the handset 1, in the position illustrated in FIG. 5, is pressed down in the cradle 2, the spring 12 of the latch is compressed and the carriage 11 moves down relative to the cradle 2 and is retained in that position by rod 19 in the manner described previously. As the carriage 11 moves down, the arms 13 are forced inward by the camming surface 28 and catches 25 engage in the complementary slots 26 in the handset 1. The contacts 10 on the bottom of the handset 1 and the sprung contacts 29 on the carriage 11 are thereby maintained in electrical contact.

When the phone is depressed again, the rod 19 is released from the locked position, the spring 12 expands, the carriage 11 rises relative to the cradle 2 and the arms 13 are able to move outwardly under their own resilience to disengage the catches 25 from the complementary slots 26 on the handset 1. The handset 1 is then free to be lifted from the cradle 2.

In both the first and second embodiments the resilience of the electrical contacts enables good contact to be maintained between the charger and the battery in the locked condition while allowing for a degree of manufacturing tolerance.

A third embodiment of the invention is described with reference to FIG. 7 of the drawings. Those elements also found in the first and second embodiments are referred to by like reference numerals.

Figure 7:
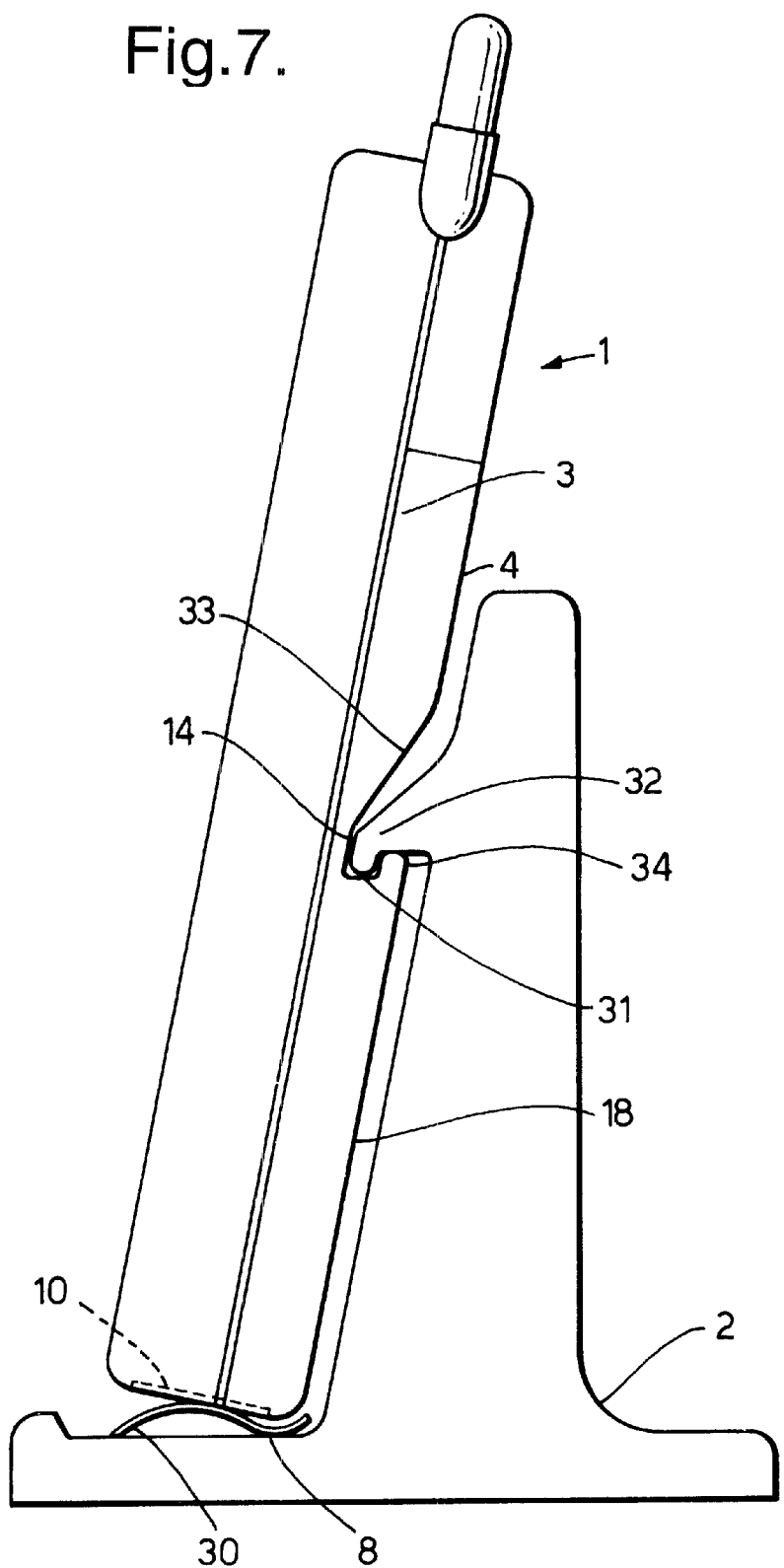
FIG. 7 is a schematic representation of a third embodiment of the invention.

The radio telephone apparatus of FIG. 7 maintains reliable electrical contact between the fixed 10 and sprung 30 contacts of the battery charger and handset 1 respectively in a different manner to that of the previous embodiments. Instead of using the latching arrangement described previously, the handset 1 is 'locked' or located within the compartment 8 of the cradle member 2 by abutment of a slot 31 in the handset 1 and a fixed peg 32 protruding from the wall of the compartment 8.

The peg 32 is angled out from the wall of the compartment 8 against the direction of withdrawal of the handset 1. The slot 31 has an angled taper 33 on its upper edge to prevent it catching the peg 32 as the handset 1 is placed in the cradle 2, and a lip 34 along its lower edge for abutment with the peg to lock the handset 1 with contact maintained between the fixed and sprung contacts 10, 30.

To lock the handset 1 in position it is placed into the compartment 8 and pressed down against the bias of the sprung contact 30. At the same time the handset 1 is pressed towards the back wall of the cradle member 2. As the handset 1 is released, the sprung contact 30 displaces the handset 1 upwards and the lip 34 on the slot 31 and the peg 32 'catch' holding the handset 1 against further upward displacement.

To remove the handset 1 it must be pressed down against the bias of the sprung contact 30 and moved away from the back of the cradle member 2 to disengage the peg 32 and lip 34 of the slot 31. The handset 1 can then be freely withdrawn from the cradle member 2.

Although the specific embodiments are described with reference to a handset this term includes hand portable radio telephones and handsets of mobile or transportable telephones. The invention also finds application in maintaining a battery pack alone in electrical contact with a recharging unit.

The present invention includes any novel feature or combination of features disclosed herein either explicitly or any generalisation thereof irrespective of whether or not it relates to the claimed invention or mitigates any or all of the problems addressed.

In view of the foregoing description it will be evident to a person skilled in the art that various modifications may be made within the scope of the invention.

What is claimed is:

1. A combined portable telephone holder and battery charger comprising:

a cradle member having a portable telephone receiving compartment and a stationary peg section located in the receiving compartment; and means, connected to the cradle member, for supplying electric current to a battery in the portable telephone when the portable telephone is inserted into the receiving compartment, wherein the electric current supplying means comprises an electrical spring contact in the receiving compartment adapted to bias the portable telephone into a locked position against the stationary peg section, wherein the peg section protrudes from a wall of the receiving compartment in an angled direction generally towards the spring contact and, wherein the spring contact is deflectable to allow a user to move the portable telephone away from the stationary peg section to an unlocked position.

2. A holder for charging a radio telephone battery disposed within a housing, comprising a cradle member, means for supplying charging current for charging the battery, an electrical contact disposed to allow electrical contact between the battery and the means for supplying charging current upon positioning the housing in the cradle member, and an element disposed on the cradle member for cooperating in abutting relation with a complementary element fixed in relation to the housing, and for releasably locking the housing relative to the cradle member in such a position that electrical contact between the battery and the means for supplying charging current is maintained, the contact extending into a bottom of a housing receiving area of the cradle member and the element on the cradle member being spaced from the bottom at an upper area of the housing receiving area that receives a middle or top end of the battery, wherein the abutting relation is maintained by a spring bias of the holder and the element disposed on the cradle member is sized and shaped such that the housing must be displaced with support from the spring bias to interlockingly engage the housing with the element disposed on the cradle member.

3. A holder according to claim 2, wherein the element disposed on the cradle member comprises a fixed protrusion for engagement with a complementary slot.

4. A holder according to claim 2, wherein the housing comprises a radio telephone apparatus.

5. Apparatus comprising a radio telephone battery disposed within a housing, a cradle member, means for supplying charging current for charging the battery, an electrical contact disposed to allow electrical contact between the battery and the means for supplying charging current on positioning the housing in the cradle member, an element disposed on the cradle member for cooperating in abutting relation with a complementary element fixed in relation to the housing, and releasably locking the housing relative to the cradle member in such a position that electrical contact between the battery and the means for supplying charging current is maintained, wherein the abutting relation is maintained by the element on the cradle member being angled towards a bottom of a housing receiving area of the cradle member and by a spring bias to disengage the housing from the element disposed on the cradle member.

6. A holder according to claim 5, wherein the element disposed on the cradle member comprises a fixed protrusion for engagement with a complementary slot.

7. A holder according to claim 5, wherein the housing comprises a radio telephone apparatus.

8. Apparatus comprising a radio telephone battery disposed within a housing, a cradle member, means for supplying charging current for charging the battery, an electrical contact disposed to allow electrical contact between the battery and the means for supplying charging current on positioning the housing in the cradle member, and an element disposed on the cradle member for cooperating in abutting relation with a complementary element fixed in relation to the housing, and releasably locking the housing relative to the cradle member in such a position that electrical contact between the battery and the means for supplying charging current is maintained, wherein the abutting relation is maintained by a spring bias of the holder, and the element disposed on the cradle member is sized and shaped such that the housing must be displaced with support from the spring bias to engage the housing with the element disposed on the cradle member.

9. A holder according to claim 8, wherein the element disposed on the cradle member comprises a fixed protrusion for engagement with a complementary slot.

10. A holder according to claim 8, wherein the housing comprises a radio telephone apparatus.

* * * * *